United States Patent [19]

Long

[11] Patent Number: 4,559,101
[45] Date of Patent: Dec. 17, 1985

[54] MOUNTING DEVICE

[75] Inventor: Richard L. Long, Rowland Heights, Calif.

[73] Assignee: The United States of America as represented by the Secretary of the Air Force, Washington, D.C.

[21] Appl. No.: 532,862

[22] Filed: Sep. 16, 1983

[51] Int. Cl.$^4$ .............................................. B32B 31/26
[52] U.S. Cl. .................................... 156/359; 248/205.3
[58] Field of Search ............... 156/359, 273.9, 274.2, 156/71; 248/205.3

[56] References Cited

U.S. PATENT DOCUMENTS

| | | | |
|---|---|---|---|
| 3,348,640 | 10/1967 | Thompson et al. | 156/273.9 X |
| 3,637,181 | 1/1972 | Janssen | 248/205.3 |
| 4,167,259 | 9/1979 | Bury | 248/205.3 |
| 4,416,713 | 11/1983 | Brooks | 156/304.6 X |

Primary Examiner—David Simmons
Attorney, Agent, or Firm—Donald J. Singer; Charles E. Bricker

[57] ABSTRACT

An apparatus for demountably mounting a device to a lightweight, brittle structure, such as high modulus structures or composite structures, which comprises a baseplate with means for attaching the device to the baseplate, at least one layer of heat-activatable material, an electrical heater, an optional heat sensor, terminals for applying electrical current to the heater and terminals for connecting a temperature indicator to the heat sensor.

4 Claims, 5 Drawing Figures

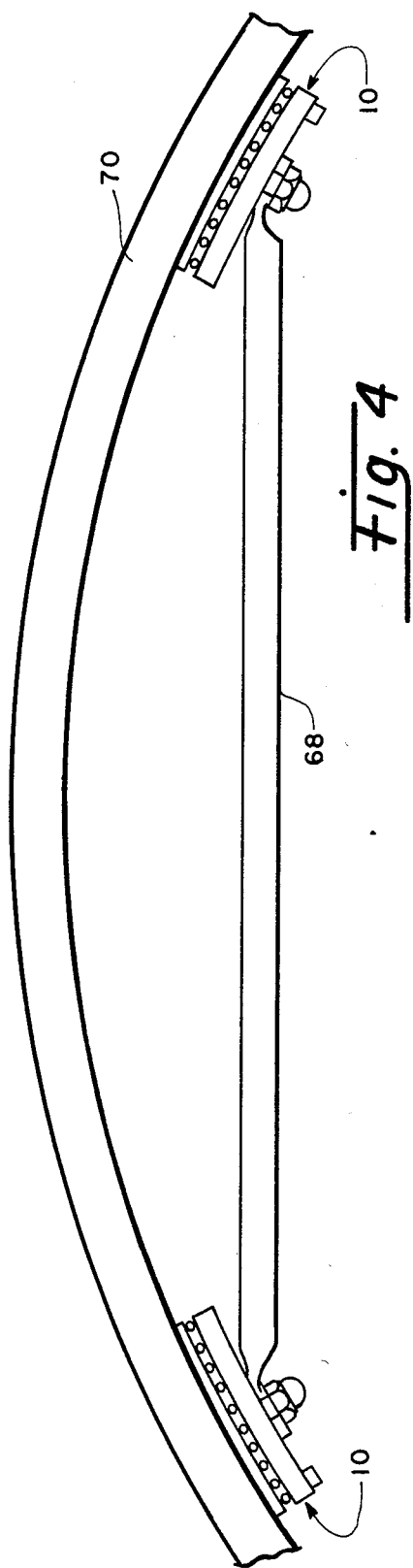
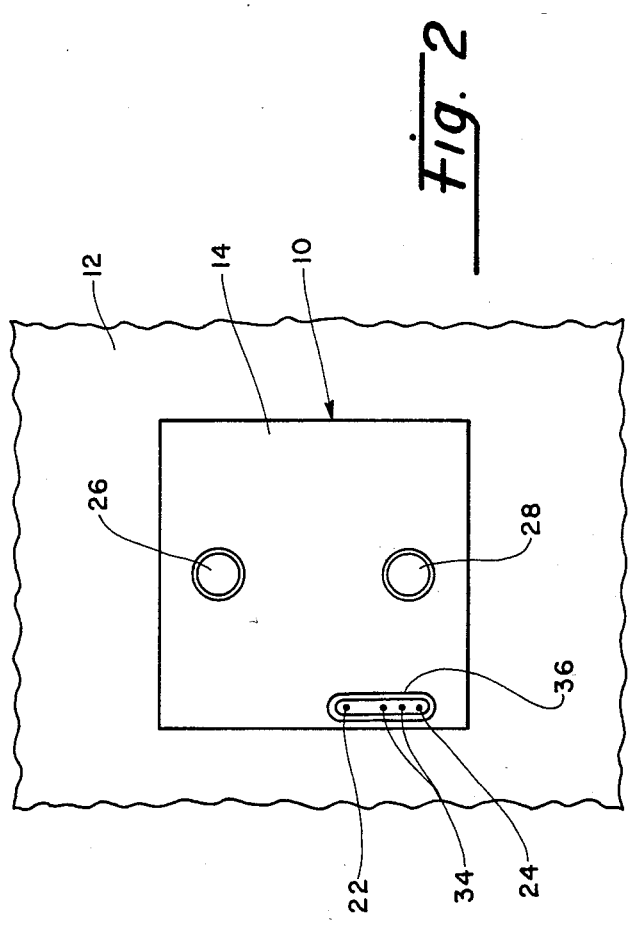

MOUNTING DEVICE

RIGHTS OF THE GOVERNMENT

The invention described herein may be manufactured and used by or for the Government of the United States for all governmental purposes without the payment of any royalty.

BACKGROUND OF THE INVENTION

This invention relates to the mounting of devices upon high modulus structures.

High modulus structures made from materials such as pyrolytic graphite as well as many composite structures are so brittle that such materials do little to distribute any nonuniform loads that may be introduced. Consequently, structures made from such materials are subject to failure significantly below design limits at stress points such as drill holes, rivet attachments, etc. These same materials contribute little to vibration damping required to dissipate undesirable energy inputs.

These brittle, extra-lightweight structures require extensive buildups in areas of mechanical attachments where take-apart joints are required to offset stress problems. These joints may exist at panel terminations that are required for panel assembly or they may exist over the surface of the panel where equipment boxes, brackets or the like are attached. If for any reason it becomes necessary to relocate a device on these panels, new bosses and fastener locations must be established, providing an additional weight penalty and higher manufacturing cost.

Adhesive bonding attachments that would eliminate the requirement for localized bosses are not, heretofore, amenable to making removable attachments on large surfaces. The adhesives used heretofore for installations upon an assembled structure are catalyzed theremosetting polymers. These adhesives are not amenable to a joint that is to be assembled/disassembled several times. Accordingly, what is desired is an apparatus and method for demountably mounting a device to a lightweight brittle structure.

It is therefore an object of the present invention to provide an apparatus for demountably mounting a device to a lightweight brittle structure.

Other objects and advantages of the present invention will become apparent to those skilled in the art from a reading of the following detailed disclosure while viewing the drawings, wherein:

FIGS. 1 and 2 are side and front plan views, respectively, of the apparatus of this invention positioned against a honeycomb structure;

FIG. 4 illustrates the use of two of the apparatus of this invention on a long, curved wall structure.

DESCRIPTION OF THE PREFERRED EMBODIMENTS

Figure 1:
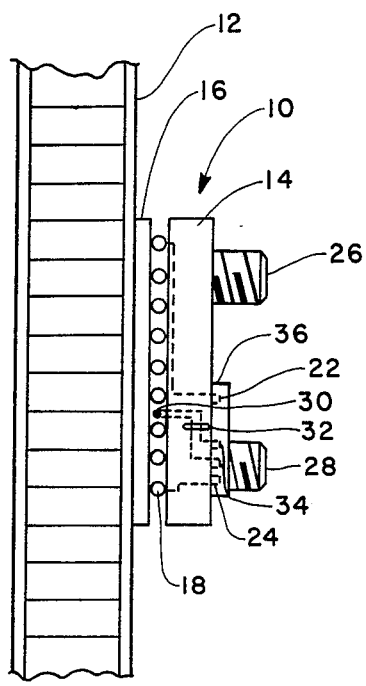

Referring to FIGS. 1 and 2, the apparatus of this invention, designated generally by the reference numeral 10, is shown ready for bonding to a honeycomb structure 12. The apparatus 10 comprises a baseplate 14, at least one layer of heat-activatable material 16, an electrical heater 18, electrical terminals 22 and 24 at the ends of the heater 18 for applying electrical current, and means including threaded studs 26 and 28 for attaching a device to the apparatus 10. The heat-activatable layer 16 and the heater 18 are, for clarity, illustrated as being initially separate and distinct. It will be appreciated that heater 18 may initially be embedded in the layer 16. Heater 18 is permanently affixed to baseplate 14 in suitable fashion.

The apparatus 10 may also comprise a heat-sensing means 30, such as a thermistor, having wire leads 32 which terminate at terminals 34. The terminals 22, 24 and 34 are housed in a socket 36.

Figure 5:
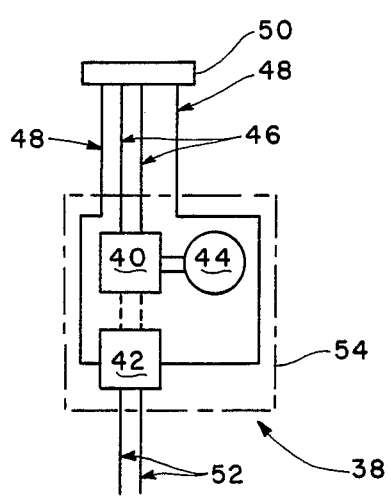
FIG. 5 is a schematic of a simple power controller for the apparatus of this invention.

Referring to FIG. 5, the apparatus 10 is activated and controlled by a controller 38 which comprises a thermistor decoding circuit 40, a current controller 42 and a temperature indicator, such as meter 44. The thermistor decoding circuit 40 may be electrically connected to the power controller 42 so as to control the current provided to the heater 18. The leads 46 to the thermistor decoding circuit 40 and the power leads 48 are routed to a plug 50, which matches socket 36. Power is supplied to controller 38 through power leads 52. Controller 38 may be contained in a housing 54 for portability and field installations.

Referring again to FIGS. 1 and 2, the apparatus 10 is prepared for installation upon honeycomb structure 12 by connecting plug 50 of controller 38 to the socket 36 of apparatus 10, and connecting power leads 52 of the controller 38 to a suitable source of electrical power. The placement location for the apparatus 10 is conditioned in accordance with conventional practice for structural adhesive bonding. The apparatus is then positioned at the placement location, and pressed against such location either mechanically or by a vacuum or the like, to hold the apparatus in intimate contact with the honeycomb structure during bonding. Power is applied to the heater 18 until a desired temperature in the heat-activatable material 16 is achieved, as indicated by the temperature indicator 44. The power is then removed and the heat-activatable material 16 is allowed to cool below its solidification temperature, as indicated by the temperature indicator 44. Pressure can then be removed from the apparatus 10. Removal of the apparatus 10 from the structure 12 can be accomplished by applying power to heater 18 until material 16 is sufficiently softened to allow separation.

Figure 3:
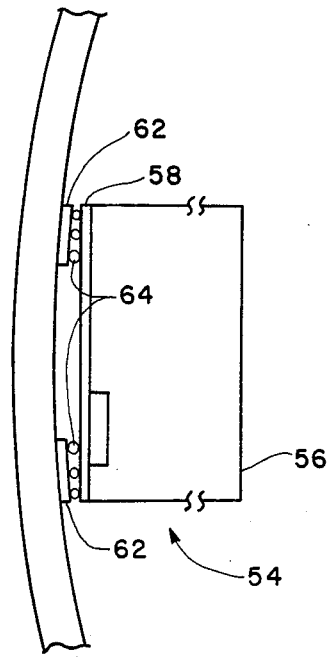
FIG. 3 is a side view of a box, including the apparatus of this invention, positioned against a curved wall structure.

FIG. 3 illustrates a device 54 comprising a component 56, such as a junction box, having a base 58, positioned against a curved, thin wall 60. The base 58 has a plurality of heat-activatable zones, each zone comprising a heat-activatable material 62 and an electrical heater 64. Also shown on base 58 is a socket 66 which contains the terminal ends of the wire leads to the heater 64 and a temperature sensor, not shown.

FIG. 4 illustrates the use of two widely spaced-apart devices 10 to anchor an item 68, such as a handhold, to a curved wall structure 70.

The heat-activatable material referred to above may be any material known in the art which has adhesive properties and is thermoplastic, e.g., a "hot-melt" glue as manufactured by United Shoe Machinery Company.

Various modifications can be made in the invention described herein without departing from the invention described in the claims.

I claim:

1. An apparatus for demountably mounting a device to a brittle, lightweight structure which comprises a baseplate, at least one layer of a heat-activatable thermoplastic adhesive, electrical heater means affixed to said baseplate, electrical terminals at the ends of said heater means for applying electrical current, heat-sensing means in contact with said adhesive for providing a decodeable signal, said heat-sensing means having wire leads which terminate at terminals, a socket for housing said wire lead terminals and said heater terminals, and means for attaching said device to said baseplate.

2. The apparatus of claim 1 including a controller means for decoding the signal from said heat-sensing means, for controlling a temperature indicating means and for controlling the current applied to said heater means and further including plug means for operably connecting said controller to said apparatus.

3. The apparatus of claim 1 wherein said attaching means comprises at least one threaded stud.

4. The apparatus of claim 1 wherein said baseplate has a plurality of heat-activatable zones, each zone consisting of said heat-activatable material and said heater means.

* * * * *